United States Patent
Murasugi et al.

Patent Number: 5,950,787
Date of Patent: Sep. 14, 1999

[54] ROTATION CLUTCH DEVICE FOR AUTOMATIC TRANSMISSION

[75] Inventors: Takashi Murasugi, Shizuoka; Hiromasa Sakai, Kanagawa; Motoharu Nishio, Yokohama, all of Japan

[73] Assignee: Nissan Motor Co., Ltd., Yokohama, Japan

[21] Appl. No.: 08/937,418

[22] Filed: Sep. 25, 1997

[30] Foreign Application Priority Data

Oct. 1, 1996 [JP] Japan .................................. 8-260747

[51] Int. Cl.⁶ .............................. F16D 25/06; F16H 3/44
[52] U.S. Cl. .................................. 192/85 AA; 192/106 F
[58] Field of Search .................... 192/85 AA, 52.4, 192/106 F; 475/14–6

[56] References Cited

U.S. PATENT DOCUMENTS

| | | | |
|---|---|---|---|
| 3,690,429 | 9/1972 | Honda | 439/352 |
| 4,083,442 | 4/1978 | Ushijima | 192/54.3 |
| 4,957,195 | 9/1990 | Kano et al. | 192/106 F |
| 5,106,348 | 4/1992 | Koivunen | 475/126 |
| 5,232,411 | 8/1993 | Hayashi et al. | 475/146 |
| 5,511,644 | 4/1996 | Murata | |
| 5,542,517 | 8/1996 | Peruski | 192/85 AA |
| 5,701,976 | 12/1997 | Kumagai et al. | 192/85 AA X |

FOREIGN PATENT DOCUMENTS

| | | |
|---|---|---|
| 0 454 866 | 11/1991 | European Pat. Off. |
| 0 692 649 | 1/1996 | European Pat. Off. |
| 898 240 | 11/1953 | Germany |
| 2142096 | 3/1972 | Germany |
| 43 02 518 | 8/1993 | Germany |
| 197 00 635 | 8/1997 | Germany |

OTHER PUBLICATIONS

"Service Manual for Full–Range Automatic Trans–Axle of Nissan RE4FO2A Type" (1988).
F4A42 (INVECS–II) (1994) pp. 2–13–2–33.

Primary Examiner—Charles A. Marmor
Assistant Examiner—Saúl Rodríguez
Attorney, Agent, or Firm—Foley Lardner

[57] ABSTRACT

A rotation clutch device rotates on an axis of an automatic transmission. The rotation clutch device comprises a clutch piston which slides around the axis of the automatic transmission for the engagement of the clutch device. First and second chamber are formed to slide the clutch piston in the direction of the engagement by receiving hydraulic pressure respectively. A cancel chamber is formed opposite to the first and second chambers through the clutch piston to cancel the centrifugal pressure generated in the first and second chambers. A selector valve selectively supplies hydraulic pressure to the first and second chambers according to a selected shift position of the automatic transmission to adapt to a different required engagement capacity in each shift position.

8 Claims, 4 Drawing Sheets

FIG.2

| RANGE | FRICTION ELEMENT | R/C | H/C | L/C | B/B P S/A | B/B P S/R | LR/B | OWC |
|---|---|---|---|---|---|---|---|---|
| P | | | | | | | | |
| R | | ○ | | | | | ○ | |
| N | | | | | | | | |
| D | 1ST SPEED | | | ○(1.786) | | | | ○ |
| D | 2ND SPEED | | | ○(1.786) | ○ | | | |
| D | 3RD SPEED | | ○ | ○(0.641) | ○ | | | |
| D | 4TH SPEED | | ○ | | ○ | ○ | | |
| 2 | 1ST SPEED | | | ○ | | | | ○ |
| 2 | 2ND SPEED | | | ○ | ○ | | | |
| 1 | 1ST SPEED | | | ○ | | | ○ | ○ |
| 1 | 2ND SPEED | | | ○ | ○ | | | |

ROTATION CLUTCH DEVICE FOR AUTOMATIC TRANSMISSION

The contents of Application No. 8-260747, with a filing date Oct. 1, 1996 in Japan, are hereby incorporated by reference.

BACKGROUND OF THE INVENTION

The present invention relates to improvements in a clutch device of an automatic transmission, and more particularly to a rotation clutch device which varies an engagement capacity thereof.

Generally, an automatic transmission is set in a predetermined shift speed by selectively engaging a plurality of friction elements through fluid pressure. Many clutches of the friction elements are of a rotation clutch device which rotates in the automatic transmission. A publication "SERVICE MANUAL FOR FULL-RANGE AUTOMATIC TRANS-AXLE OF NISSAN RE4F02A TYPE" discloses a typical automatic transmission which includes a rotation clutch device such as a low clutch or high clutch. Each rotation clutch device of this typical automatic transmission is arranged such that an engagement capacity thereof is fixed. Some conventional automatic transmissions are arranged to engage a rotation clutch device in a plurality of shift speeds whose required torque share ratios are different from each other. Accordingly, the conventional rotation clutch device is designed so as to adapt to the shift speed whose required torque share ratio is maximum. This increases the size of the rotation clutch device so as to require a large space for this device and to increase a production cost thereof. In addition, when the shift change to a shift position whose required torque share ratio is small is executed, it is necessary to finely control the clutch operation pressure while keeping it at a small value in order to suppress a shift shock. Further, even if a source pressure of the clutch working pressure is fluctuated slightly, the clutch working pressure is largely affected to increase the fluctuation of the shift change performance of the automatic transmission in the above mentioned shift change. This degrades the quality of the automatic transmission. On the other hand, some non-rotation type clutches are of a variable engagement capacity type which has a plurality of piston chambers for varying the engagement capacity. However, if such structure of the non-rotation clutch is simply applied to a rotation clutch, the rotation clutch generates a dragging due to the rotation itself. In order to improve this dragging, a UD clutch of a rotation type installed in an automatic transmission of F4A42 (INVECS-II) type, which is produced by MITSUBISHI MOTORS CORP., is arranged to include a centrifugal pressure cancel chamber for canceling a centrifugal pressure generated in a clutch piston chamber.

However, if such multi piston chamber structure of the non-rotation type clutch is applied to the rotation clutch, it is necessary to provide a plurality of centrifugal pressure cancel chambers to cancel the centrifugal pressures of the plurality of piston chambers. This complicates the structure of the rotation clutch and increases a production cost thereof.

SUMMARY OF THE INVENTION

It is an object of the present invention to provide an improved rotation clutch device which enables an automatic transmission to select a plurality of shift positions each of which has a different required torque share ratio, by executing the engagement of the rotation clutch device.

Another object of the present invention is to provide a rotation clutch device which ensures a variable engagement capacity while providing one centrifugal pressure cancel chamber.

A rotation clutch device according to the present invention is installed in an automatic transmission which generates a predetermined shift position by selectively engaging a plurality of friction elements including the rotation clutch device. The rotation clutch device is engaged in a plurality of shift positions which have different required torque share ratios respectively. The rotation clutch device comprises a clutch drum, an inner cylinder, a clutch piston, a partition piston, a partition wall and a hydraulic pressure supplying means. The inner cylinder is integral with the clutch drum and has first, second and third holes. The clutch piston is slidably installed between the clutch drum and the inner cylinder. The clutch piston, the clutch drum and the inner cylinder define a clutch piston chamber. The partition piston is slidably disposed in the clutch piston chamber to divide the clutch piston chamber into a first chamber apart from the clutch piston and a second chamber adjacent to the clutch piston. The partition piston has an outer diameter which is smaller than that of the clutch piston. The first and second chambers receive hydraulic pressure through the first and second hole, respectively. The partition wall is disposed opposite to the partition piston through the clutch piston. The partition wall is slidably installed between the clutch drum and the inner cylinder. The partition wall defines a centrifugal pressure cancel chamber with the clutch drum, the inner cylinder and the clutch piston. The partition wall has an outer diameter which is generally as same as that of the clutch piston. The centrifugal pressure cancel chamber receives hydraulic pressure through the third hole. The hydraulic pressure supplying means selectively supplies hydraulic pressure to the first chamber and the second chamber according to a selected shift position of the automatic transmission.

In another aspect of the invention, a spacer is disposed between the clutch piston and the partition piston so that the hydraulic pressure is applied to a whole pressure receiving area of the clutch piston.

In yet another aspect of the invention, when the number of the shift positions having respectively different required torque share ratios is greater than or equal to three, the number of the partition pistons to be disposed in the clutch piston chamber is increased so as to adapt to the number of the required torque share ratios, the partition pistons being arranged such that the outer diameters of the partition pistons are smaller the farther apart they are from the clutch piston.

In yet another aspect of the invention, a spacer is disposed between the partition pistons so that the hydraulic pressure is applied to whole pressure receiving areas of the partition pistons.

BRIEF DESCRIPTION OF THE DRAWINGS

FIG. 2 is an logic table which shows an engagement theorem of friction elements of the automatic transmission of FIG. 1;

DETAILED DESCRIPTION OF THE INVENTION

Referring to FIGS. 1 to 4, there is shown an embodiment of a rotation clutch device installed in an automatic transmission of an automotive vehicle in accordance with the present invention.

Figure 1:
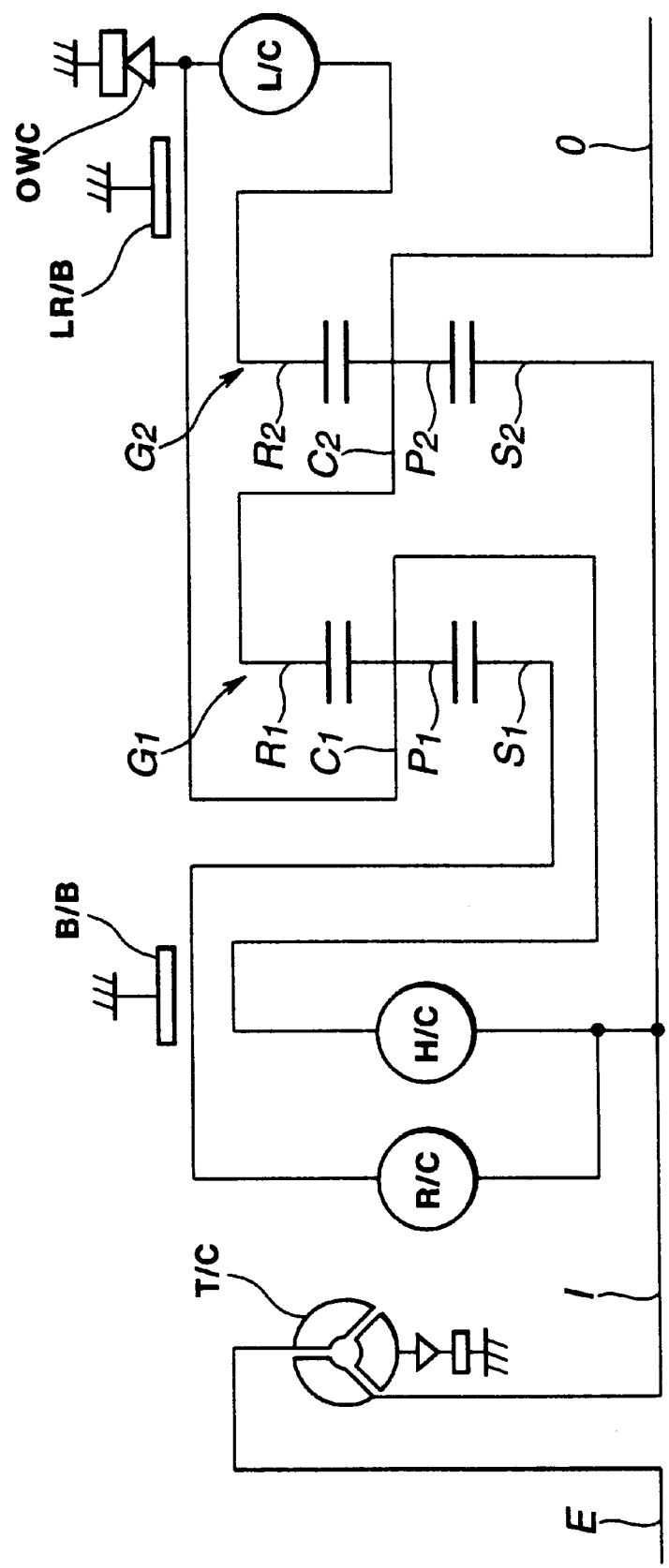
FIG. 1 is a schematic view which shows a gear train of an automatic transmission including a rotation clutch device of an embodiment according to the present invention.

As shown in FIG. 1, a first planetary gear set $G_1$ and a second planetary gear set $G_2$ are coaxially arranged. The first planetary gear set $G_1$ is of a simple type and includes a first sun gear $S_1$, a first pinion $P_1$, a first carrier $C_1$ and a first ring gear $R_1$. Similarly, the second planetary gear set $G_2$ is of a simple type and includes a second sun gear $S_2$, a second pinion $P_2$, a second carrier $C_2$ and a second ring gear $R_2$. An input shaft I of the automatic transmission receives motive power from an engine output shaft E through a torque converter T/C. The input shaft I is connected to the second sun gear $S_2$ and is connectable with the first carrier $C_1$ through a high clutch H/C. Further, the input shaft I is connectable with the first sun gear $S_1$ through a reverse clutch R/C and is fixable by means of a band brake B/B.

A one way clutch OWC functions to prevent the first carrier $C_1$ from rotating in a reverse direction against the rotational direction of the engine output shaft E. The first carrier $C_1$ is fixable by means of a low reverse brake LR/B. The first carrier $C_1$ is connectable with the second ring gear $R_2$ by means of a low clutch L/C. The second carrier $C_2$ is connected with the first ring gear $R_1$ and an output shaft O.

Figure 3:
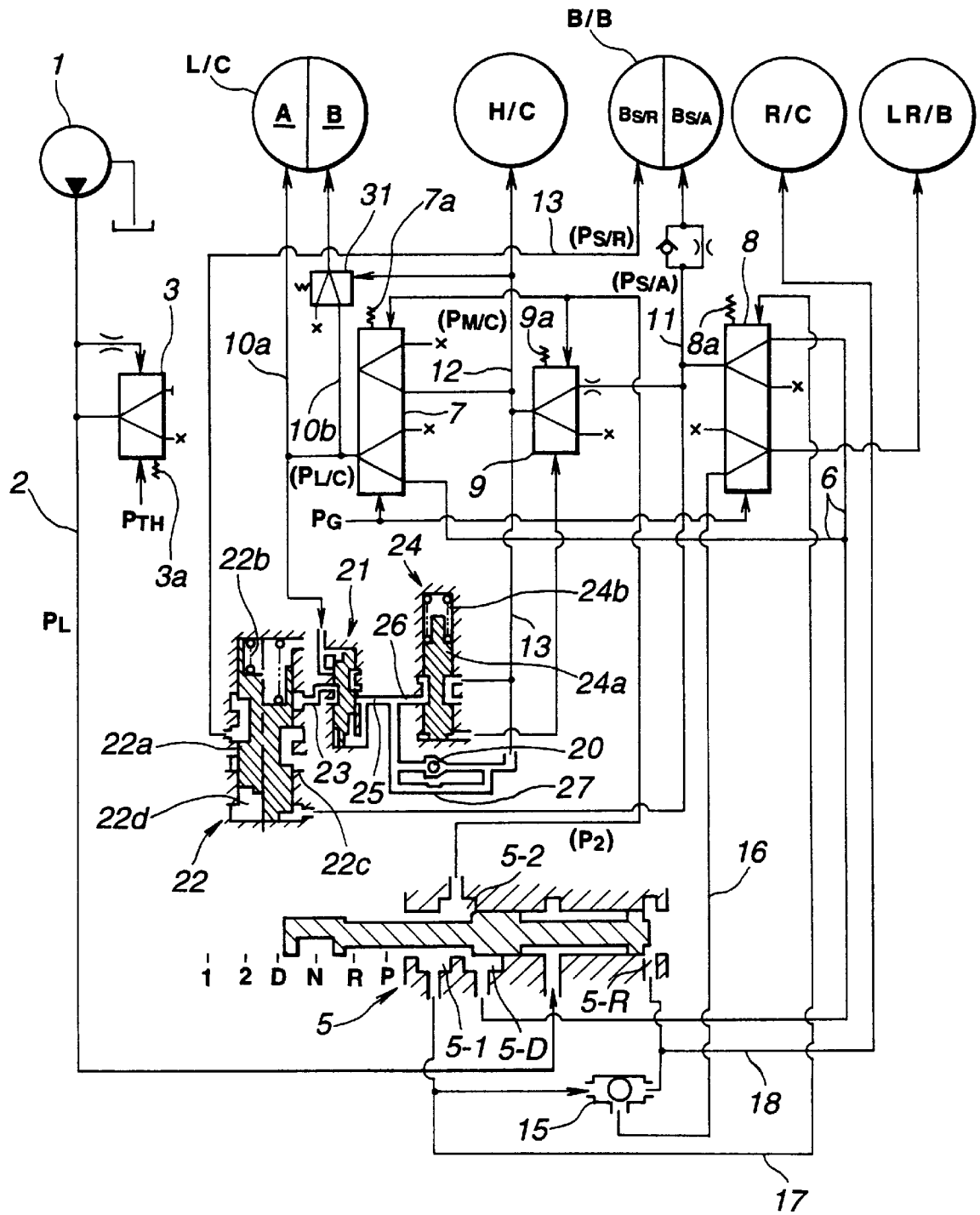
FIG. 3 is a hydraulic circuit diagram which shows a shift change control apparatus for realizing the engagement theorem of FIG. 2.

As shown in FIG. 3, the band brake B/B has a servo release chamber $B_{S/R}$ to which a servo release pressure $P_{S/R}$ for releasing the band brake B/B is supplied and a servo apply chamber $B_{S/A}$ to which a servo apply pressure $P_{S/A}$ for engaging the band brake B/B is supplied. When the servo release pressure $P_{S/R}$ is supplied to the servo release chamber $B_{S/R}$, the band brake B/B is disengaged regardless of the apply condition of the servo apply pressure $P_{S/A}$ to the servo apply chamber $B_{S/A}$.

FIG. 2 shows an engagement logic table where each shift position corresponding to the gear train of FIG. 1 is established by the combination of the pressure supply to various friction elements. In this engagement logic table of FIG. 2, a mark O indicates that hydraulic pressure is supplied to the marked friction element when the marked shift range is selected.

Referring to FIG. 3, there is shown a shift control hydraulic circuit of the automatic transmission including the rotation clutch device such as a low clutch L/C in accordance with the present invention. As shown in FIG. 3, an oil pump 1 is disposed to supply pressurized oil to a passage 2. The pressure of discharged oil from the oil pump 1 is basically controlled at a line pressure $P_L$ by means of a pressure regulator valve 3 which includes a spring 3 for determining the controlled pressure through a spring force thereof. The pressure regulator valve 3 receives a throttle pressure $P_{TH}$ which is increased according to the increase of an opening degree of an engine throttle of an engine connected to the automatic transmission. The pressure regulator valve 3 functions to increase the line pressure $P_L$ in the passage 2 in proportion to the load of the engine. The controlled line pressure $P_L$ is supplied to a manual valve 5. The manual valve 5 is controlled by a driver of the vehicle so that a desired shift position is selected from a parking range (P-range), a reverse drive range (R-range), a stopping range (N-range), an automatic shifting drive range (D-range), a second speed engine-brake drive range (2-range) and a first speed engine-brake drive range (1-range).

When the P-range or N-range is selected, the manual valve 5 sets the all output ports 5-D, 5-2, 5-1 and 5-R thereof into a drained condition by stopping the supply of the line pressure $P_L$ thereto. By this draining of the all ports 5-D, 5-2, 5-1 and 5-R, all friction elements L/C, H/C, B/B and LR/B are disengaged, and therefore the gear train shown in FIG. 1 is set in a neutral condition in which the engine drive power is not transmitted to wheels of the vehicle.

When the D-range is selected, the manual valve 5 is set to output the line pressure $P_L$ from the passage 2 to the output port 5-D. The line pressure $P_L$ is applied to a 3–4 shift valve 7 and a 1–2 shift valve 8 through a passage 6. Each of the 2–4 shift valve 7, the 1–2 shift valve 8 and a 2–3 shift valve 9 is arranged such that each spool position of each shift valve 7, 8, 9 is determined at a lower position shown by the indication of each valve 7, 8, 9 in FIG. 3 by means of each of corresponding springs 7a, 8a and 9a under a normal condition. That is, the line pressure $P_L$ applied to the 3–4 shift valve 7 through the passage 6 is supplied to the low clutch L/C through passages 10a and 10b as a working pressure $P_{L/C}$. The low clutch L/C is engaged by this supply of the line pressure $P_L$. The line pressure $P_L$ applied to the 1–2 shift valve 8 through the passage 6 is stopped at this 1–2 shift valve 8. Therefore, the automatic transmission is set to engage only the low clutch L/C. As clearly shown in FIG. 2, when the low clutch L/C is engaged and the one way clutch OWC is engaged, the automatic transmission is set into a first speed position.

Figure 4:
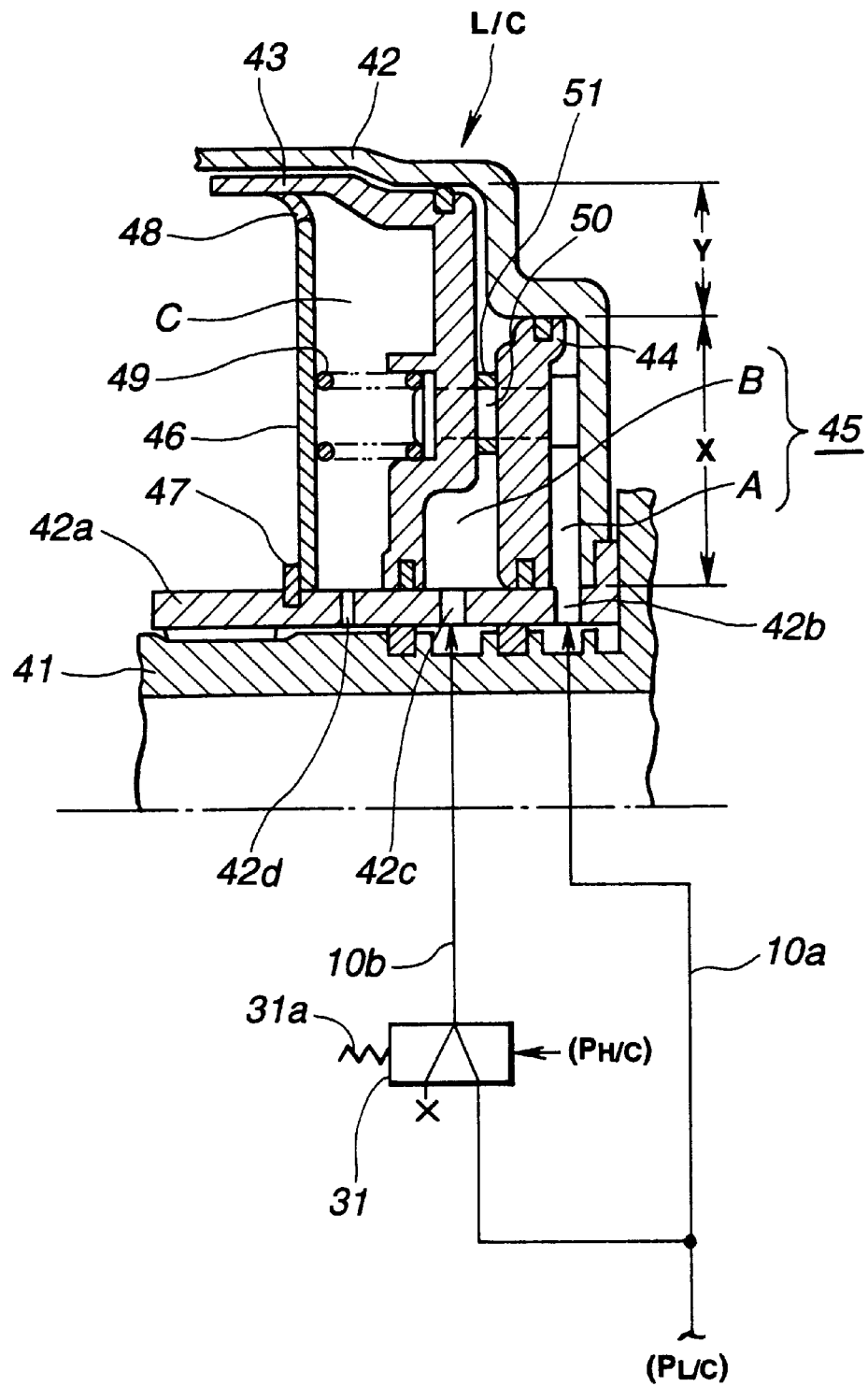
FIG. 4 is a partial cross sectional view of a low clutch functioning as a rotation clutch device of an engagement capacity variable type in the gear train according to the present invention.

The low clutch L/C is arranged to have two operation pressure chambers A and B as shown in FIG. 4. The detailed explanation thereof will be discussed in the explanation of an engagement capacity selector valve 31 set in the passage 10b hereinafter.

Under the first speed position selected as mentioned above, when a governor pressure $P_G$ proportional to the vehicle speed is increased according to the increase of the vehicle speed, the port connection of the 1–2 shift valve 8 is changed, and the line pressure $P_L$ of the passage 6 is supplied to the band brake B/B through a passage 11 as a servo apply pressure $P_{S/A}$ to engage the band brake B/B. Therefore, when the band brake B/B is engaged by the above-mentioned manner and when the engagement of the low clutch L/C is held, the automatic transmission is set into a second speed position as shown in FIG. 2.

When the governor pressure $P_G$ is further increased according to the further increase of the vehicle speed, the port connection of the 2–3 shift valve 9 is changed and the line pressure $P_L$ of the passage 11 is outputted to a passage 12. Further, the line pressure $P_L$ to the passage 12 is supplied to the high clutch H/C as its working pressure $P_{H/C}$ to engage the high clutch H/C. The line pressure $P_L$ of the passage 12 is further supplied as a servo release pressure $P_{S/R}$ to the band brake B/B through a check valve 20 in a passage 13, a SR timing valve 21 and a selector valve 22 in order to disengage the band brake B/B. In this condition, the SR timing valve 21 is set at a position shown by a left half portion of the SR timing valve 21 in FIG. 3 due to the low clutch pressure $P_{L/C}$. The selector valve 22 is set at a position shown by a left half portion of the selector valve 22 in FIG. 3 due to the servo apply pressure $P_{S/A}$.

Since the holding of the engagement of the low clutch L/C, the engagement of the high clutch H/C and the disengagement of the band brake B/B are established in the automatic transmission, the third speed is selected by the automatic transmission as is clear from FIG. 2.

Following to the setting of the third speed, when the governor pressure $P_G$ is further increased according to the further increase of the vehicle speed, the port connection of the 3–4 shift valve 7 is changed to communicate the passage 10 with the drain passage in order to cancel the low clutch pressure $P_{L/C}$. The selector valve 22 is set at the position shown by the left half portion of the selector valve 22 of FIG. 3 due to the servo apply pressure $P_{S/A}$, and the SR timing valve 21 is set at a position shown by a right half portion of the SR timing valve 21 of FIG. 3. Therefore, the servo release pressure $P_{S/R}$ is drained from a drain portion of the 3–4 shift valve 7 through the selector valve 22 and the SR timing valve 21. As a result, the disengagement of the low clutch L/C, the engagement of the band brake B/B and the holding engagement of the high clutch H/C are established in the automatic transmission. Therefore, the automatic transmission is set in the fourth speed as is clear from FIG. 2.

Next, regarding a situation that shift range of the automatic transmission is manually changed from the automatic shift drive range to one of the 2-range and the 1-range according to a driver intent, the operation of the automatic transmission, particularly to the operation of the hydraulic circuit of the automatic transmission will be discussed in detail.

When the 2-range is selected, the manual valve 5 is set to output the line pressure $P_L$ to the port 5-D and to the port 5-2 as 2-range pressure $P_2$. The line pressure $P_L$ from the port 5-D through the passage 6 is supplied to the 3–4 shift valve 7 and the 1–2 shift valve 8 as similar to the case of the D-range. The 2-range pressure $P_2$ from the port 5-2 is supplied to the 3–4 shift valve 7 and the 2–3 shift valve 9 so as to hold the 3–4 shift valve 7 and the 2–3 shift valve 9 at the respective positions each of which is shown by the lower position thereof in FIG. 3. Therefore, the shift change to the third speed and/or the fourth speed is forbidden. Since the port connecting condition of the 1–2 shift valve 8 is determined according to the magnitude of the governor pressure $P_G$, the first speed or second speed is selected according to the determined port connecting condition in the automatic transmission. This enables the driving of the vehicle in the first speed or second speed and enables the engine brake driving at the second speed by the forbidden of the shift change to the third or fourth speed.

When the 1-range is selected, the manual valve 5 is set to output the line pressure $P_L$ to the port 5-1 in addition to the output to the port 5-D and to the port 5-2. The line pressure $P_L$ from the port 5-1 is supplied to the 1–8 shift valve 8 through a shuttle valve 15 and a passage 16 and is directly supplied to the 1–8 shift valve 8 through a passage 17. When the 1-range is selected and when the vehicle speed is within an over-rotation range where the over rotation of the engine rotation speed is generated, the port connection of the 1–8 shift valve 8 is set at an upper position shown by the 1–8 shift valve 8 of FIG. 3. When the 1-range is selected and when the vehicle speed is smaller than the over-rotation range, the port connection of the 1–8 shift valve 8 is set at a position shown by a lower indication of the 1–8 shift valve 8 of FIG. 3.

In the above former condition of the 1-range and the over-rotation range, the second speed is selected, and the 1–2 shift valve 8 functions to select the second speed so as to prevent the over rotation of the engine by the engine brake due to the second speed. When the vehicle speed is decreased so as not to generate the over speed, the 1–2 shift valve 8 holds the latter condition of the 1-range and out of the over-rotation range. Therefore, the pressure of the passage 16 is supplied to the low reverse brake LR/B to engage the low reverse brake LR/B. This engagement of the low reverse brake LR/B in cooperation with the engagement of the low clutch L/C enables the automatic transmission to execute the engine brake drive at the first speed.

When R-range is selected, the manual valve 5 is set to output the line pressure $P_L$ from the passage 2 only to the port 5-R. The line pressure $P_L$ is applied to the reverse clutch R/C through a passage 18. On the other hand, the line pressure $P_L$ is applied to the 1–2 shift valve 8 through the shuttle valve 15 and the passage 16. Since the governor pressure $P_G$ is not generated under the R-range, the port condition of the 1–2 shift valve 8 is set at the lower position of the 1–2 shift valve 8 indicated in FIG. 3. Therefore, the pressure of the passage 16 is supplied to the low reverse brake LR/B to engage the low reverse brake LR/B. Accordingly, the automatic transmission selects the reverse shift range (R-range) as is clear from FIG. 2 due to the engagement of the reverse clutch R/C and the engagement of the low reverse brake LR/B.

The selector valve 22 is arranged to have a spool 22a which is pushed by a spring 22b as shown by a right hand side portion of the selector valve 22 of FIG. 3. When the selector valve 22 is set as indicated by the right hand side portion of FIG. 3, the servo release chamber $B_{S/R}$ is communicated with a drain port 22c. An end surface of the spool 22a opposite to an end contacting with the spring 22b defines a chamber 22d to which the passage 11 is connected so that the spool 22a is moved according to the servo apply pressure $P_{S/A}$. That is, when the servo apply pressure $P_{S/A}$ becomes greater than a value corresponding to the force of the spring 22b, the spool 22a is set at a position indicated by a left hand side portion of the selector valve 22 of FIG. 3 so as to connect the servo release chamber $B_{S/R}$ with a passage 23 communication with the SR timing valve 21.

When the pressure applied to an end surface of a spool 21a of the SR timing valve 21 is the same as that applied to the other end surface of spool 21a of the SR timing valve 21, the spool 21a is set at a position indicated by a left hand side of the SR timing valve 21 of FIG. 3. In this setting of the spool 21a at the left hand side indication of FIG. 3, the passage 23 is communicated with the check valve 20 and a passage 25 of the 3–2 timing valve 24. When the pressure is applied only to the lower side end surface of FIG. 3, the spool 21a is set at a position indicated by a right hand side of the SR timing valve 21 of FIG. 3. In this setting of the spool 21a at the right hand side indication of FIG. 3, the passage 23 is communicated with a low clutch pressure passage 10a.

The 3–2 timing valve 24 is arranged such that a spool 24a is normally set at a position shown in FIG. 3. By this setting of the spool 24a in the normal condition, the pressure of a passage 25 is applied to the high clutch pressure passage 12 through a small orifice 27 and a large orifice 26 in parallel. When the governor pressure $P_G$ applied to the lower end surface of the spool 24a becomes greater than a value corresponding to a spring force of a spring 24b under a high vehicle speed condition, the spool 24a is lifted up to close the large orifice 26 and to apply the pressure of the passage 25 to the high clutch pressure passage 12 only through the small orifice 27.

Next, the manner of a shift change operation to which the SR timing valve 21, the selector valve 22 and the 3–2 timing valve 24 are related will be discussed.

When the third speed is selected and when a drive condition is changed into a condition to be changed into the second speed, the port condition of the 2–3 shift valve 9 is set at a lower side position shown in FIG. 3 due to a spring 9a. When the 2–3 shift valve 9 is set at the lower side position shown in FIG. 3, the 2–3 shift valve 9 is set to drain the high clutch pressure $P_{H/C}$ so as to disengage the high clutch H/C. On the other hand, the SR timing valve 21 is held at a left hand side portion shown in FIG. 3 by the low clutch pressure $P_{L/C}$. The selector valve 22 is held at a left hand side portion shown in FIG. 3 by the servo apply pressure $P_{S/A}$. Therefore, the servo release pressure $P_{S/R}$ is applied to the passage 25 through the selector valve 22, the passage 23 and the SR timing valve 21.

Herein, when the vehicle speed is low, the 3–2 timing valve 24 is set as shown in FIG. 3. That is, the servo release pressure $P_{S/R}$ applied to the passage 25 is supplied to a drain port of the 2–3 shift valve 9 through the two passages of the small orifice 27 and the large orifice 25 and is quickly discharged through the drain port of the 2–3 shift valve 9 in the low vehicle speed condition. Accordingly, the band brake B/B is engaged due to the servo apply pressure $P_{S/A}$. On the other hand, When the vehicle speed is high, the spool of the 3–2 timing valve 24 is lifted up against the spring 24a. That is, the servo release pressure $P_{S/R}$ applied to the passage 25 is supplied to the drain port of the 2–3 shift valve 9 only through the small orifice 27 and is slowly drained through the drain port of the 2–3 shift valve 9. Accordingly, the band brake B/B is slowly engaged by the servo apply pressure $P_{S/A}$. Therefore, even if the vehicle speed is high or low, the band brake B/B is timely engaged during the shift change so as to decrease the shock due to the shift change.

Hereinafter, it is assumed that the gear train of the automatic transmission shown in FIG. 1 is arranged such that the teeth number of the first sun gear $S_1$ is 33, the teeth number of the pinion $P_1$ is 21, the teeth number of the first ring gear $R_1$ is 75 in the first planetary gear unit $G_1$, the teeth number of the second sun gear $S_2$ is 42, the teeth number of the second pinion $P_2$ is 17, and the teeth number of the second ring gear $R_2$ is 75 in the second planetary gear unit $G_2$.

The low clutch L/C is a rotation clutch device which rotates itself around an axis of the automatic transmission and is to be engaged during the shift change of first, second and third speeds. The low clutch L/C is required to have a required torque share ratio which is varied according to the shift speed in the drive range (D-range) as shown in FIG. 2. That is, when the first or second speed is selected, the required torque share ratio is 0.786 (large). When the third speed is selected, the required torque share ratio is 0.641 (small).

In order to arrange the low clutch L/C such that the engagement capacity thereof is varied according to the torque share ratio which is changed according to the selected shift speed as mentioned above, the low clutch L/C according to the present invention is constructed as shown in FIG. 4.

The low clutch L/C comprises a clutch drum 42 which is rotated on a fixed shaft 41 and a clutch piston 43 which is slidably and sealing moved within the clutch drum 42. The low clutch L/C is arranged to establish the engagement thereof when the clutch piston 43 is stroked in the left hand side as viewed from a front side of FIG. 4.

A partition piston 44, which has an outer diameter smaller than that of the clutch piston 43, is slidably disposed in a clutch piston chamber 45 to which the low clutch pressure $P_{L/C}$ is supplied. The clutch piston chamber 45 is defined by the clutch drum 42 and the clutch piston 43. The partition piston 44 divides the clutch piston chamber 45 into a first chamber A apart from the clutch piston 43 and a second chamber B adjacent to the clutch piston 43 as shown in FIG. 4.

A partition wall 46, which has an outer diameter generally similar to that of the clutch piston 43, is disposed opposite to the partition piston 44 through the clutch piston 43. The inner periphery of the partition wall 46 is in contact with a snap ring 47 fixed to an inner cylinder 42a of the clutch drum 42 so as to restrict the sliding movement of the partition wall 46 toward a direction apart from the clutch piston 43. An outer peripheral portion 48 made of an elastic material such as rubber is connected to an outer periphery of the partition wall 46 and is elastically and sealingly in contact with an inner surface of the clutch piston 43. That is, the clutch piston 43, the partition wall 46 and the inner cylinder 42a define a centrifugal pressure cancel chamber C as shown in FIG. 4. A return spring 49 set in a compressed condition is disposed between the clutch piston 43 and the partition wall 46.

The clutch piston 43, the partition piston 44 and the partition wall are arranged such that the inner diameter thereof are generally the same and are slidably engaged with the inner cylinder 42a of the clutch drum 42. The inner cylinder 42a of the clutch drum 42 has a first hole 42b communicated with the first chamber A, a second hole 42c communicated with the second chamber B and a third hole 42d communicated with the centrifugal pressure cancel chamber C. The low clutch pressure $P_{L/C}$ from the passage 10a is supplied to the first chamber A through the first hole 42b. The low clutch pressure $P_{L/C}$ from the passage 10b is supplied to the second chamber B through the second hole 42c. The centrifugal pressure cancel chamber C receives fluid through the third hole 42d. The clutch piston 43 is integrally connected with the partition piston 44 by means of pins 50 which are disposed on a coaxial circle at predetermined intervals so that the clutch piston 43 and the partition piston 44 are integrally moved in the piston stroke direction. A spacer 51 is installed to each pin 50 so that the clutch piston 43 and the partition piston 44 have a clearance therebetween.

When the engagement capacity selector valve 31 is put in the normal condition where the high clutch pressure $P_{H/C}$ is not applied thereto, the passage 10b is opened by a spring 31a so that the low clutch pressure $P_{L/C}$ is supplied to the second chamber B through the passage 10b. When the high clutch pressure $P_{H/C}$ is applied to the engagement capacity selector valve 31, the port connecting condition of the engagement capacity selector valve 31 is changed to close the passage 10b and communicate the second chamber B with the drain port of the engagement capacity selector valve 31. Therefore, the pressurized fluid in the second chamber B is drained through the drain port of the engagement capacity selector valve 31.

Next, the engagement capacity selecting control of the low clutch L/C according to the present invention will be discussed.

The low clutch pressure $P_{L/C}$, which is to be applied to the low clutch L/C when the automatic transmission is put in one of the first, second and third speeds, is always applied to the first chamber A of the low clutch L/C through the passage 10a and is selectively applied to the second chamber B through the passage 10b according to the operation of the engagement capacity selector valve 31.

As is clear from the engagement logic table of FIG. 2, when the first or second speed of the automatic transmission is selected, the high clutch pressure $P_{H/C}$ for establishing the engagement of the high clutch H/C is not generated. Therefore, when the first or second speed is selected, the high clutch pressure $P_{H/C}$ is not applied to the engagement pressure capacity selector valve 31, and the passage 10b is opened by the spring 31a. Accordingly, when the first or second speed is selected, the low clutch pressure $P_{L/C}$ is supplied to the second chamber B through the passage 10b.

In contrast, when the third speed of the automatic transmission is selected, the high clutch pressure $P_{H/C}$ is generated as is clear from the engagement logic table of FIG. 2. The high clutch pressure $P_{H/C}$ is applied to the engagement capacity selector valve 31 to change the port connecting condition of the engagement capacity selector valve 31. By this change of the port connecting condition, the communication between the second chamber B and the passage 10a is cut, and the second chamber B is communicated with the drain port of the engagement capacity selector valve 31. Therefore, when the third speed is selected, the low clutch pressure $P_{L/C}$ is not supplied to the second chamber B.

With this control arrangement of the low clutch L/C according to the present invention, when the first or second speed of the automatic transmission is selected, the engagement capacity of the low clutch L/C is increased to meet the demand required in the first or second speed, by supplying the low clutch pressure to both of the first and second chambers A and B of the low clutch L/C. On the other hand, when the third speed is selected, the engagement capacity of the low clutch L/C is decreased to meet the demand required in the third speed, by supplying the low clutch pressure only to the first chamber A of the low clutch L/C.

Since the low clutch L/C according to the present invention is arranged to variably change the engagement capacity thereof according to the required torque share ratio in each selected speed of the automatic transmission, it becomes possible to design the low clutch L/C to be simple and compact without designing it in large size as designed conventionally. This enables the low clutch to be designed so that it is small and inexpensive so as to ensure a space for installation easily and a cost merit largely. Further, since the low clutch L/C according to the present invention is produced in small size, the shift shock due to the low clutch L/C becomes small. Accordingly, the low clutch pressure $P_{L/C}$ may not be set at a so small value during the shifting to or from the third speed in which the required torque share ratio is small. Additionally, even if the clutch working pressure is not finely controlled, the shift shock due to the low clutch L/C is kept small and the shift control is easily executed. Furthermore, even if the source pressure of the low clutch pressure $P_{L/C}$ is slightly fluctuated, the shift change using the low clutch L/C according to the present invention is held stable without fluctuating the execution of the shift change.

Hereinafter, the manner of the centrifugal pressure canceling operation of the low clutch L/C according to the present invention will be discussed.

Even in a case that the low clutch L/C is not engaged, the fluid remaining in the first and second chambers A and B receives the centrifugal force due to the rotation of the low clutch L/C, and therefore the centrifugal pressure is generated in each of the first and second chambers A and B. The centrifugal pressure generated in the first chamber A is applied to a pressure receiving area X shown in FIG. 4 to push the clutch piston 43 toward the direction to which the low clutch L/C is engaged. The centrifugal pressure generated in the second chamber B is applied to a pressure receiving area Y shown in FIG. 4 to push the clutch piston 43 toward the engaged direction of the low clutch L/C. Therefore, even if the low clutch L/C is put in an inoperative condition, the low clutch L/C tends to generate a dragging so that the low clutch L/C is slippingly rotated by the slight pushing force of the clutch piston 43 caused by the centrifugal pressure in the first and second chambers A and B. However, the low clutch L/C according to the present invention is arranged so that the centrifugal force is applied to the fluid in the centrifugal pressure cancel chamber C to generate the centrifugal pressure in the centrifugal pressure cancel chamber C. The centrifugal pressure generated in the centrifugal pressure cancel chamber C is applied to the pressure receiving area X+Y shown in FIG. 4 so as to push the clutch piston 43 toward the direction to which the low clutch L/C is disengaged. Therefore, the pushing force generated in the first and second chambers A and B is cancelled by the pushing force generated in the centrifugal pressure cancel chamber C to prevent the dragging of the low clutch L/C.

What is claimed is:

1. A rotation clutch device of an automatic transmission, the automatic transmission generating a predetermined shift position by selectively engaging a plurality of friction elements including the rotation clutch device, the rotation clutch device being engaged in a plurality of shift positions, which have different required torque share ratios respectively, said rotation clutch device comprising:

a clutch drum;

an inner cylinder integral with said clutch drum, said inner cylinder having first, second and third holes;

a clutch piston slidably disposed between said clutch drum and said inner cylinder;

a clutch piston chamber defined by said clutch piston, said clutch drum and said inner cylinder;

a partition piston slidably disposed in the clutch piston chamber to divide the clutch piston chamber into a first chamber apart from said clutch piston and a second chamber adjacent to said clutch piston, said partition piston having an outer diameter which is smaller than that of said clutch piston, the first and second chambers receiving hydraulic pressure through the first and second holes, respectively;

a partition wall disposed on an opposite side of said clutch piston relative to said partition piston, said partition wall being disposed between said clutch drum and said inner cylinder, said partition wall having an outer diameter which is generally the same as that of said clutch piston;

a centrifugal pressure cancel chamber defined by said partition wall, said inner cylinder and said clutch piston, the centrifugal pressure cancel chamber receiving hydraulic pressure through the third hole; and a hydraulic pressure supplying device that selectively supplies hydraulic pressure to the first chamber and the second chamber according to a selected shift position of the automatic transmission.

2. A rotation clutch device as claimed in claim 1, wherein when the number of the shift positions having respectively different required torque share ratios is greater than or equal to three, at least one additional partition piston is disposed in the clutch piston chamber to adapt to the number of required torque share ratios, said partition pistons being arranged such that each partition piston has an outer diameter that is smaller than an outer diameter of each partition piston disposed closer to said clutch piston.

3. A rotation clutch device as claimed in claim 2, wherein a spacer is disposed between said partition pistons so that the hydraulic pressure is applied to whole pressure receiving areas of said partition pistons.

4. A rotation clutch device as claimed in claim 1, wherein a spacer is disposed between said clutch piston and said partition piston so that the hydraulic pressure is applied to a whole pressure receiving area of said clutch piston.

5. A rotation clutch device as claimed in claim 1, wherein said clutch piston is connected with said partition piston to maintain a constant spacing between said clutch piston and said partition piston during the stroke of said clutch piston and said partition piston.

6. A rotation clutch device as claimed in claim 1, wherein said hydraulic pressure supplying device includes an engagement capacity selector valve which controls the supply of hydraulic pressure to the second chamber according the selected shift position.

7. A rotation clutch device as claimed in claim 1, further comprising a snap ring secured to said inner cylinder, wherein said snap ring restricts movement of said partition wall in a direction toward a position at which the rotation clutch is engaged.

8. A rotation clutch device of an automatic transmission rotating on an axis of the automatic transmission, the rotation clutch device being engaged when one of a plurality of shift positions, which have different required torque share ratios respectively, is selected, said rotation clutch device comprising:

piston means for sliding along the axis of the automatic transmission to establish the engagement of the rotation clutch device;

means for defining a first chamber to which hydraulic pressure is applied for sliding said piston means in the direction of the engagement;

means for defining a second chamber which is formed between said piston means and said first chamber, said second chamber receiving hydraulic pressure for sliding said piston means in the direction of the engagement, an outer diameter of said second chamber being greater than that of said first chamber;

means for defining a centrifugal pressure cancel chamber which pushes said piston means by a force corresponding to the sum of centrifugal pressure forces generated by said first and second chambers, the centrifugal pressure forces being generated by rotation of the first and second chambers; and hydraulic pressure supplying means for selectively supplying hydraulic pressure to said first chamber and said second chamber according to a selected shift position of the automatic transmission.

* * * * *